(12) United States Patent
Wiesenberg et al.

(10) Patent No.: US 11,194,008 B2
(45) Date of Patent: Dec. 7, 2021

(54) TRIANGULATION AND CALIBRATION OF ELECTRONIC CONTROL UNITS

(71) Applicant: Toyota Motor Engineering & Manufacturing North America, Inc., Erlanger, KY (US)

(72) Inventors: Ryan M. Wiesenberg, Ann Arbor, MI (US); Brian J. Pinkelman, Ann Arbor, MI (US)

(73) Assignee: TOYOTA MOTOR ENGINEERING AND MANUFACTURING NORTH AMERICA, INC., Plano, TX (US)

( * ) Notice: Subject to any disclaimer, the term of this patent is extended or adjusted under 35 U.S.C. 154(b) by 91 days.

(21) Appl. No.: 16/664,296

(22) Filed: Oct. 25, 2019

(65) Prior Publication Data
US 2021/0124009 A1    Apr. 29, 2021

(51) Int. Cl.
*G01S 5/00*     (2006.01)
*B60W 50/04*    (2006.01)
*B60W 30/00*    (2006.01)

(52) U.S. Cl.
CPC ........... *G01S 5/0072* (2013.01); *B60W 30/00* (2013.01); *B60W 50/04* (2013.01)

(58) Field of Classification Search
CPC ...... G01S 5/0072; B60W 30/00; B60W 50/04
USPC ........................................................ 701/33.1
See application file for complete search history.

(56) References Cited

U.S. PATENT DOCUMENTS

| | | | |
|---|---|---|---|
| 7,467,034 B2 | 12/2008 | Breed et al. | |
| 7,672,756 B2 | 3/2010 | Breed | |
| 8,055,412 B2 | 11/2011 | Passaro et al. | |
| 8,169,311 B1 | 5/2012 | Breed | |
| 9,338,170 B2 | 5/2016 | Ricci | |
| 9,482,524 B2 | 11/2016 | Metzler et al. | |
| 9,533,576 B2 | 1/2017 | Kalbus | |
| 9,563,990 B2 | 2/2017 | Khan et al. | |
| 9,936,442 B1 * | 4/2018 | Noonan | C10G 2/33 |
| 10,346,698 B2 | 7/2019 | Torii et al. | |
| 2005/0038574 A1 | 2/2005 | Gila et al. | |

(Continued)

FOREIGN PATENT DOCUMENTS

| | | | | |
|---|---|---|---|---|
| AU | 2006330059 A1 * | 7/2007 | .......... | G01V 5/0075 |
| CN | 101207802 A | 6/2008 | | |

(Continued)

*Primary Examiner* — Atul Trivedi
(74) *Attorney, Agent, or Firm* — Jordan IP Law, LLC (57) ABSTRACT

Methods and systems provide for technology to identify a trigger event. In response to the trigger event, the technology executes a triangulation process that includes a transmission and reception of triangulation signals between the plurality of ECUs to identify current positions of the plurality of ECUs. A first current position among the current positions is associated with a first ECU among the plurality of ECUs. The technology conducts an identification that the first current position is different from a first recorded position of the first ECU. In response to the identification that the first current position is different from the first recorded position, the technology identifies an adjustment factor based on the first current position. The technology calibrates one or more of the plurality of ECUs based on the adjustment factor to adjust control of at least one system of a plurality of systems of the vehicle.

20 Claims, 10 Drawing Sheets

(56) References Cited

U.S. PATENT DOCUMENTS

| | | | | |
|---|---|---|---|---|
| 2007/0109111 A1* | 5/2007 | Breed | ............ | G01S 13/867 |
| | | | | 340/435 |
| 2007/0152804 A1* | 7/2007 | Breed | ............ | B60W 30/16 |
| | | | | 340/435 |
| 2012/0206050 A1* | 8/2012 | Spero | ............ | H05B 47/11 |
| | | | | 315/152 |
| 2013/0076522 A1* | 3/2013 | Csaszar | ............ | G06F 3/017 |
| | | | | 340/686.1 |
| 2014/0309847 A1* | 10/2014 | Ricci | ............ | G06Q 20/384 |
| | | | | 701/33.1 |
| 2017/0132922 A1* | 5/2017 | Gupta | ............ | G08G 1/04 |
| 2018/0091550 A1* | 3/2018 | Cho | ............ | H04L 5/0055 |
| 2018/0126910 A1* | 5/2018 | Herrmann | ............ | B60R 1/074 |
| 2018/0322711 A1* | 11/2018 | Weimerskirch | ............ | G07C 5/0808 |
| 2019/0028500 A1* | 1/2019 | Lee | ............ | H04L 63/1425 |
| 2019/0031203 A1* | 1/2019 | Fox | ............ | B60W 50/04 |
| 2020/0242922 A1* | 7/2020 | Dulberg | ............ | G08G 1/164 |

FOREIGN PATENT DOCUMENTS

| | | | |
|---|---|---|---|
| CN | 105026225 B | | 5/2017 |
| DE | 102013227129 B4 | | 1/2016 |
| JP | 06188707 B2 | | 8/2017 |
| WO | WO-2018169634 A1 * | 9/2018 | ............ G08G 1/0133 |

* cited by examiner

TRIANGULATION AND CALIBRATION OF ELECTRONIC CONTROL UNITS

TECHNICAL FIELD

Embodiments generally relate to electronic control units. More particularly, embodiments relate to triangulation of electronic control units (ECUs) and calibration of the ECUs based on the triangulation.

BACKGROUND

An ECU may be a system that controls one or more of systems (e.g., electrical systems) in a vehicle. It will be understood that system may include various types of systems, such as subsystems and super systems. The ECUs of a vehicle may be a computing device, and may span across many components of the vehicle. For example, various ECUs may include powertrain control modules that controls different systems of the vehicle such as the engine control unit and transmission control unit, door control units to control electronics on a vehicle door, engine control units to control actuators of an engine, seat control units to control aspects (e.g., firmness, angle, posture, etc.) of the vehicle's seats, speed control unit to control a cruise control of the vehicle, transmission control units to control an automatic transmission of the vehicle. Thus, each ECU controls a corresponding system.

Some ECUs may require accurate pose information (e.g., orientation and positioning) to operate efficiently and safely. For example autonomous driving ECUs may require accurate positioning data to accurately control movements of the vehicle. As another example, some sensors (e.g., LIDAR or another similar sensor) may need to be assured of its orientation relative to the road to understand which objects and/or markings the sensor may detect. For example, a sensor pointed at the ground may expect to image paint-markers, whereas a sensor pointing outward from a side of the vehicle may expect to see vehicles at similar speeds. Further, a sensor pointed toward the sky may expect to see road signs or bridges, etc. Thus, relative positions of the ECUs relative to each other may be needed in some applications. In vehicles, the original positions of the ECUs may be modified intentionally or unintentionally (e.g., an accident). In such cases, the vehicle may fail altogether, therefore inconveniencing the driver, produce inaccurate results and lower efficiency. Thus, ECUs may inefficiently control systems based on inaccurate positioning data thereby reducing safety, lowering efficiency and causing inconvenience to operators of the vehicle.

BRIEF SUMMARY

In some embodiments a system for a vehicle is provided. The system includes a plurality of systems, and a plurality of electronic control units (ECUs) disposed at a plurality of positions in the vehicle and to control the plurality of systems. The plurality of ECUs include control logic to identify a trigger event, and in response to the trigger event being identified, execute a triangulation process that includes a transmission and reception of triangulation signals between the plurality of ECUs to identify current positions of the plurality of ECUs, wherein a first current position of the current positions is associated with a first ECU among the plurality among ECUs, conduct an identification that the first current position is different from a first recorded position of the first ECU, in response to the identification that the first current position is different from the first recorded position, identify an adjustment factor based on the first current position, and calibrate one or more of the plurality of ECUs based on the adjustment factor to adjust control of at least one system of the plurality of systems controlled by the one or more of the plurality of ECUs.

In some embodiments, at least one computer readable storage medium comprises a set of instructions, which when executed by one or more of a plurality of electronic control units (ECUs) of a vehicle, cause the one or more of the plurality of ECUs to identify a trigger event, and in response to the trigger event being identified, execute a triangulation process that includes a transmission and reception of triangulation signals between the plurality of ECUs to identify current positions of the plurality of ECUs, wherein a first current position among the current positions is associated with a first ECU among the plurality of ECUs, conduct an identification that the first current position is different from a first recorded position of the first ECU, in response to the identification that the first current position is different from the first recorded position, identify an adjustment factor based on the first current position, and calibrate one or more of the plurality of ECUs based on the adjustment factor to adjust control of at least one system of a plurality of systems of the vehicle, wherein the at least one system is to be controlled by the one or more of the plurality of ECUs.

In some embodiments, a method of controlling a plurality of electronic control units (ECUs) of a vehicle is provided. The method includes identifying a trigger event, and in response to the trigger event being identified, executing a triangulation process that includes a transmission and reception of triangulation signals between the plurality of ECUs to identify current positions of the plurality of ECUs, wherein a first current position among the current positions is associated with a first ECU among the plurality of ECUs, conducting an identification that the first current position is different from a first recorded position of the first ECU, in response to the identification that the first current position is different from the first recorded position, identifying an adjustment factor based on the first current position, and calibrating one or more of the plurality of ECUs based on the adjustment factor to adjust control of at least one system of a plurality of systems of the vehicle, wherein the at least one system is to be controlled by the one or more of the plurality of ECUs.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1A:
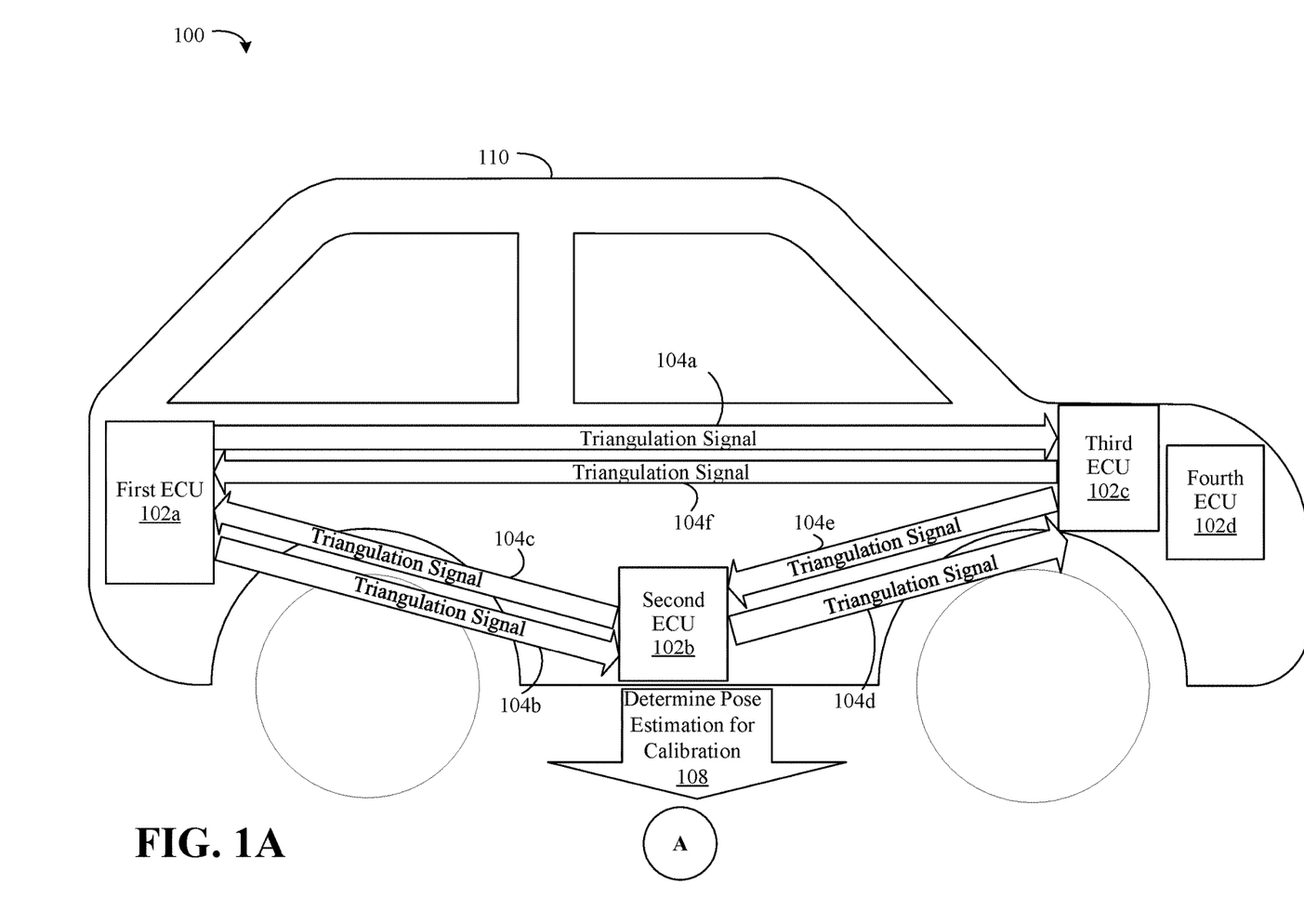
FIGS. 1A and 1B are diagrams of an example of an ECU triangulation and calibration process according to an embodiment.
Figure 1B:
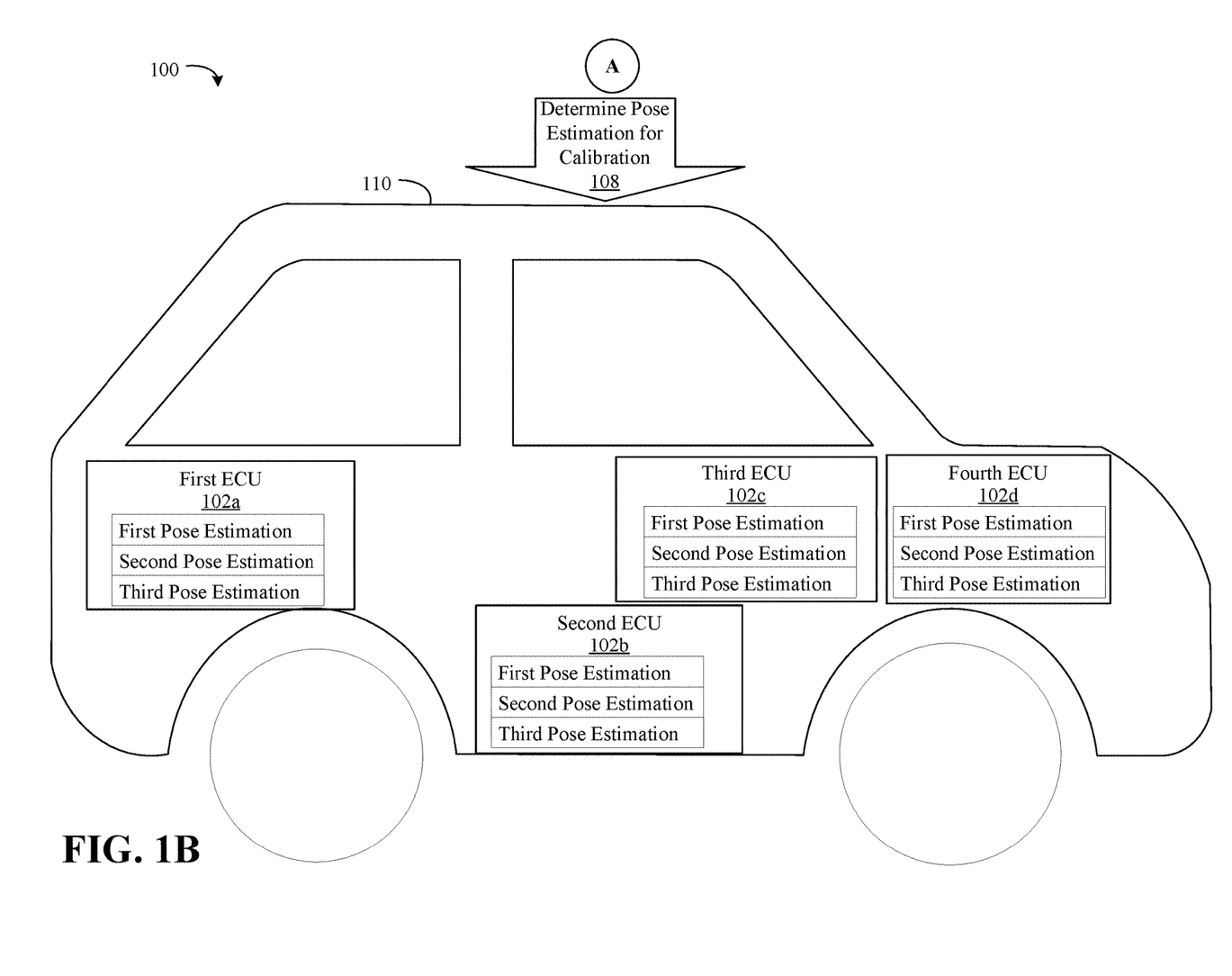

Turning now to FIGS. 1A-1B, an ECU triangulation and calibration process 100 is illustrated. The process 100 may execute at predetermined intervals and/or in response to trigger events. The trigger events may include an addition or removal of an ECU from vehicle 110, impact detection, each time vehicle 110 is actuated, temperature fluctuations and so forth. The trigger events may correspond to events that potentially cause a change in positions of ECUs 102a-102d. The ECUs 102a-102d may include control logic (e.g., hardware elements, fixed-functionality logic hardware and/or configurable logic, etc.) to identify when the trigger occurs, and execute the triangulation and calibration process 100. The control logic may be distributed across the ECUs 102a-102d. The ECUs 102a-102d may form a pose estimation and calibration system.

As illustrated in FIG. 1A, in the process 100, first, second and third ECUs 102a-102c of vehicle 110 transmit triangulation signals 104a-104f to each other. For example, the first, second and third ECUs 102a-102c may each include transmitter and receiver components to execute wireless transmission of triangulation signals 104a-104f in addition to an identification of self-localization. Each of the first-third ECUs 102a-102c may control a different system of the vehicle 110.

The first, second and third ECUs 102a-102c may receive and transmit the triangulation signals 104a-104f to identify relative locations of the first, second and third ECUs 102a-102c relative to one another and/or with respect to a frame of reference such as the outer perimeter of the vehicle 110. Each ECU 102a-102c may identify a location for itself. A fourth ECU 102d may also be present in the vehicle 110 but not necessarily participate in the transmission of the triangulation signals 104a-104f.

The process 100 may include a determination of pose estimations for calibration 108 based on the triangulation signals 104a-104f. For example, each respective ECU of the first-third ECUs 102a-102c may determine characteristics (e.g., strength, time to travel, sender data, origination point, etc.) of triangulation signals of the triangulation signals 104a-104f that are received and transmitted by the respective ECU to determine a pose estimation of the respective ECU. For example, the pose estimation may include a position of the respective ECU in X, Y, Z coordinates as well as an orientation (yaw, pitch, and roll) of the respective ECU. For example, the respective ECU may identify the pose estimation of a transmission sensor of the respective ECU based on various ones of the triangulation signals 104a-104f. The respective ECU may determine identify a relative orientation of the transmission sensor relative to the respective ECU, and calculate the pose estimation (e.g., orientation) of the respective ECU by modifying the pose estimation of the transmission sensor based on the relative orientation. In some embodiments, the respective ECU may further identify an impact on confidence of the accuracy of any measurement. For example, the confidence of a measurement may be higher when there are more points of transmission (e.g., more ECUs participate in triangulation), and the confidence of a measurement may be lower when the signal is weaker and/or there are less points of transmission. In some embodiments, in a case of "chaining localization" a receiving ECU of the first-third ECUs 102a-102c may be aware of a confidence of a transmitting ECU of the first-third ECUs 102a-102c (e.g., the transmitting ECU includes the confidence in the transmission to the receiving ECU along with orientation and position measurements), and adjust a confidence of the receiving ECU accordingly. Doing so may enable error threshold to be adjusted.

For example, the first ECU 102a may receive the triangulation signals 104c and 104f from the second ECU 102b and the third ECU 102c respectively. The first ECU 102a may identify characteristics of the triangulation signals 104c and 104f, and determine a first pose estimation of the first ECU 102a based on the characteristics of the triangulation signals 104c and 104f.

Moreover, the first ECU 102a may determine the first pose estimation based on reception characteristics of the triangulation signals 104a, 104b. For example, the first ECU 102a may transmit the triangulation signals 104a, 104b to the second and third ECUs 102b, 102c. The second and third ECUs 102b, 102c may transmit corresponding information back to the first ECU 102a indicating reception characteristics of the triangulation signals 104a, 104b. For example, the third ECU 102c may transmit as part of the reception characteristics, a reception time at which the triangulation signal 104a was received. The first ECU 102a may determine a travel time of the triangulation signal 104a based on a difference between a transmission time of the triangulation signal 104a and the reception time. The travel time may correspond to a distance between the first and third ECUs 102a, 102c. The first ECU 102a may identify a relative position between the first and third ECUs 102a, 102c based on the distance. Similarly, the first ECU 102a may determine a distance between the first ECU 102a and the second ECU 102b based on reception characteristics of the triangulation signal 104b.

Similarly, the second ECU 102b may determine a second pose estimation for the second ECU 102b based on triangulation signals 104b, 104e that originate from the first ECU 102a and the third ECU 102c respectively, as well as the triangulation signals 104c, 104d that originate from the second ECU 102b. Similarly, the third ECU 102c may determine a third pose estimation for the third ECU 102c based on triangulation signals 104a, 104d that originate from the first ECU 102a and the second ECU 102b respectively, as well as based on triangulation signals 104e, 104f that originate from the third ECU 102c.

Thus, the process 100 may determine first, second and third pose estimations for calibration 108. FIG. 1B illustrates the first-fourth ECUs 102a-102d after the first, second and third pose estimations are determined through the triangulation process described above. FIG. 1B illustrates a decentralized storage system for the first-third pose estimations. That is, the first-third pose estimations may not necessarily be stored on a central location. Rather, the first-third pose estimations may be stored in a distributed fashion across the first-fourth ECUs 102a-102d. The fourth ECU 102d may receive the first-third pose estimations from any of the first-third ECUs 102a-102c to facilitate control of a system of the fourth ECU 102d.

That is, in some embodiments, the first-fourth ECUs 102a-102d may control systems based on the first-third pose estimations. For example, the first-fourth ECUs 102a-102d may identify adjustment factors (described in more detail below) based on the first-third pose estimations, and calibrate one or more of the first-fourth ECUs 102a-102d based on the adjustment factors to control one or more of the systems of the vehicle 110. In order to determine the adjustment factors, the first-third pose estimations may be compared to previously recorded first-third pose estimations of the first-third ECUs. 102a-102c. The previously recorded first-third pose estimations may have been previously recorded during a previous triangulation and calibration process.

For example, the first pose estimation of the first ECU 102a may be compared to a previously recorded first pose estimation of the first ECU 102a. If the first ECU 102a identifies a difference between the first pose estimation and the previously recorded first pose estimation, the first ECU 102a may determine an adjustment factor to compensate for the difference.

For example, an adjustment factor may include a limitation to a function of a system. As a more detailed example, the fourth ECU 102d may conduct a determination that the first-third pose estimations are within acceptable operational boundaries to operate the vehicle 110. The fourth ECU 102d may then allow the vehicle 110 to be actuated based on the determination. If the fourth ECU 102d identified that one or more of the first-third pose estimations are outside of the acceptable boundaries, the fourth ECU 102d may disallow actuation of the vehicle 110, and provide a warning to the user of the vehicle 110 via a dashboard, cellular transmission, audio transmission, etc. Thus, the fourth ECU 102d may limit (e.g., inhibit) a function of the system based on one or more of the first-third pose estimations.

In some embodiments, the first-fourth ECUs 102a-102d identify adjustment factors that includes adjustment to processing parameters (e.g., error of thresholds, weight calibrations) based on the first-third pose estimations, and for example based on positions of the first-third pose estimations. For example, suppose that the fourth ECU 102d controls autonomous driving of the vehicle 110 and that the first-third ECUs 102a-102c detect and process various environmental factors (e.g., positions of surrounding vehicles, image recognition to detect pedestrians) and/or provide location information of outer perimeters of the vehicle 110. The fourth ECU 102d may control the autonomous driving based on the environmental factors and the location information. If the first pose estimation indicates that the first ECU 102a has moved, the fourth ECU 102d may adjust the processing parameters to process the data from the first ECU 102a so that the processing parameters reflect the change in the first pose estimation. Thus, even the first ECU 102a moves, the fourth ECU 102d may still nonetheless utilize information from the first ECU 102a.

Thus, the first-fourth ECUs 102a-102d may enhance safety and operation by executing processes based on frequently updated and accurate pose estimations to adjust process parameters. As described above, various triggers may cause the process 100 to execute, and may include events that potentially cause a change in positions of ECUs 102a-102d. Thus, the first-fourth ECUs 102a-102d may quickly and efficiently detect if a position has been changed, and calibrate operational characteristics if so. Such a system results in a more resilient vehicle that is less likely to fail due to positional changes in the first-fourth ECUs 102a-102d. For example, even if the vehicle 110 is involved in a car accident to cause one or more the first-fourth ECUs 102a-102d to move, the first-fourth ECUs 102a-102d may execute the triangulation process 100 to recalibrate and continue operation.

In some embodiments, the first-third ECUs 102a-102d may control systems based on less than all the first-third pose estimations, depending on the system to be controlled. For example, the first ECU 102a may control a system based only on the first pose estimation of the first ECU 102a.

In the particular example, each of the first-fourth ECUs 102a-102d may store the first, second and third pose estimations. Thus, if one ECU of the first-fourth ECUs 102a-102d is damaged and unable to be detected, an operator may access any of the other first-fourth ECUs 102a-102d to determine a location of the one ECU to take action (e.g., replacement or repair).

In some embodiments however, each of the first-fourth ECUs 102a-102d may store less than all the first-third pose estimations. In such embodiments, persistence of each of the first-third pose estimations may be enhanced by storing each of the first-third pose estimations on at least two different ECUs of the first-fourth ECUs 102a-102d.

In some embodiments, at least one of the first, second and third ECUs 102a-102c may have an accurate identification of a location of the at least one of the first, second and third ECUs 102a-102c. The other ECUs of the first, second and third ECUs 102a-102c may determine locations of the other ECUs based on the location of the at least one of the first, second and third ECUs 102a-102c which may be transmitted via the triangulation signals 104a-104f.

As described above, the first-fourth ECUs 102a-102d may form a part of a wireless network to communicate with each other. In some embodiments, the first-fourth ECUs 102a-102d may include wired connection to communicate with each other.

In some embodiments, less than three ECUs may participate in the triangulation process. For example, one ECU of the first-third ECUs 102a-102c may include three points of transmission (e.g., a miniature triangulation system), to accurately identify a position of the one ECU or other ECUs. In some embodiments, a miniature triangulation system may also be used by an ECU to self-identify its own pose of the first-third ECUs 102a-102c to enhance accuracy.

In some embodiments, the first-third ECUs 102a-102c may form a triangle to perform the process 100 described above. That is, the ECUs 102a-102c may not be arranged in a linear fashion (e.g., in line with one another). In some embodiments, the first-third ECUs 102a-102c are installed along outer body panels of a body of the vehicle 110, and/or within the body as well.

It is worthwhile to note that the adjustment factors described above may be based at least in part on the positions of the first, second and third postures. In some embodiments, the fourth ECU 102d (which does not participate in the triangulation process) may be able to identify a pose estimation for the fourth ECH 102d based on localized data. For example, the fourth ECU may store an identification of the relative pose of the fourth ECU 102d relative to the third ECU 102c. The fourth ECU 102d may determine a current pose of the fourth ECU 102d based on the relative posture and the third pose estimation of the third ECU 102c.

Figure 1C:
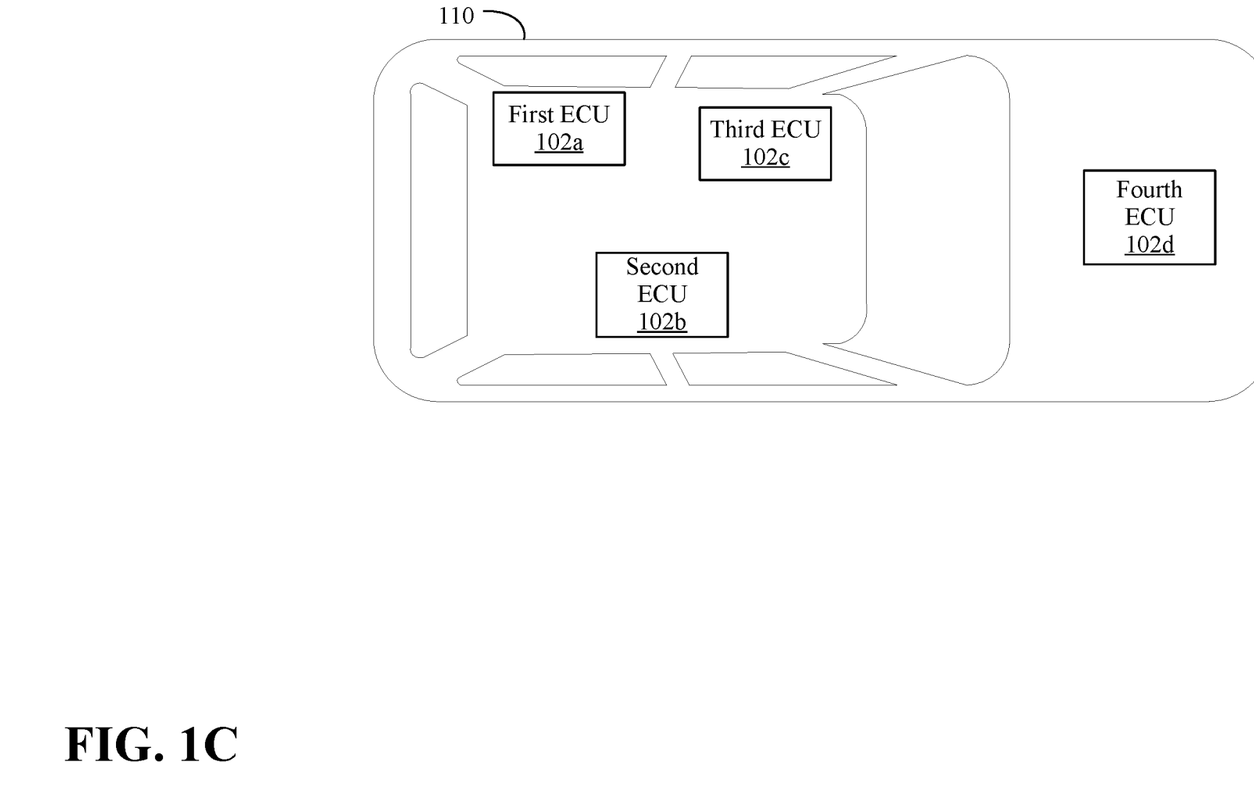
FIG. 1C is an overhead view of the vehicle that implements the ECU triangulation and calibration process.

FIG. 1C illustrates an overhead view of the vehicle 110 that implements the triangulation and calibration process 100. As illustrated, the first-fourth ECUs 102a-102d are disposed laterally relative to each other, in addition to at different heights relative to each other.

Figure 2:
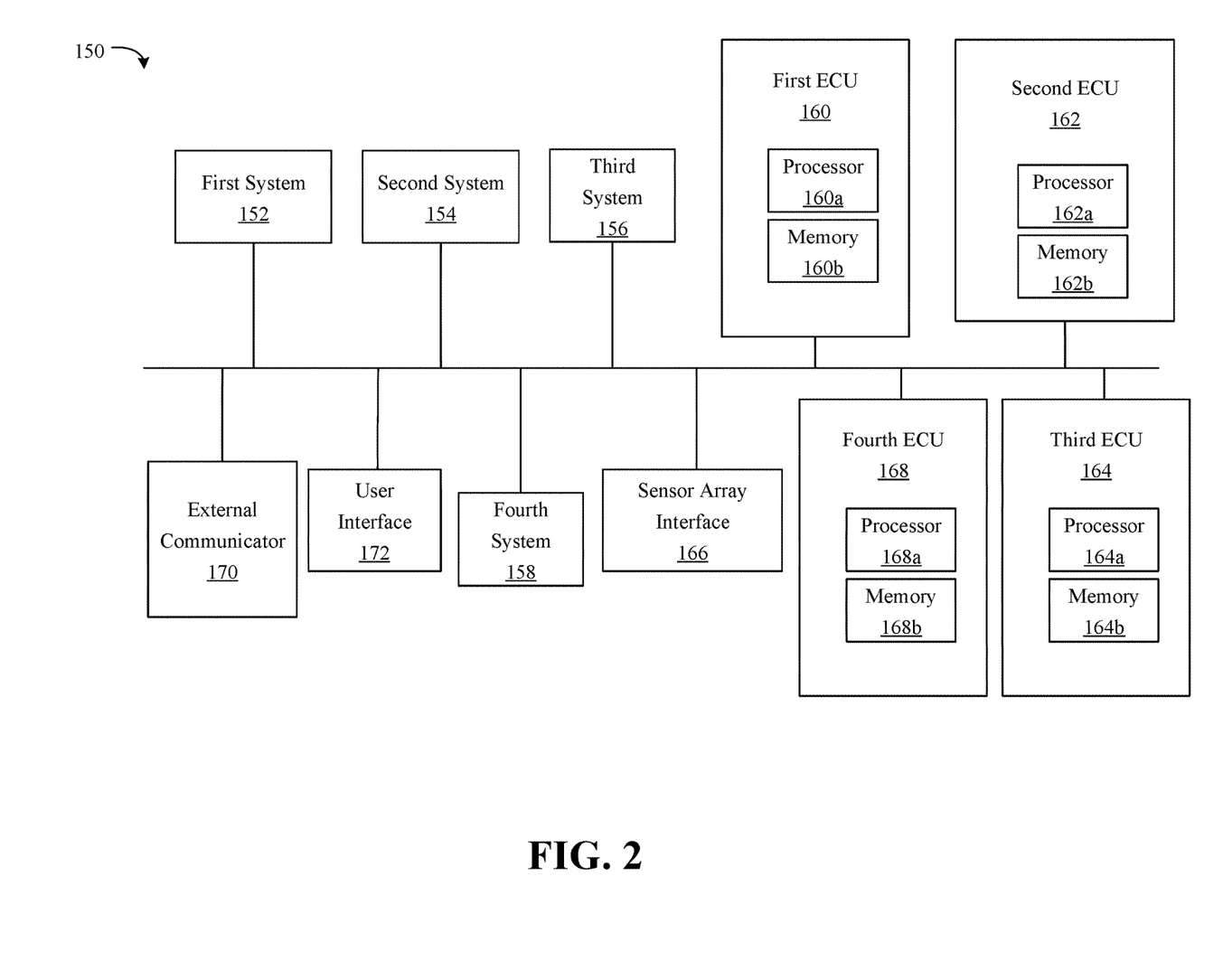
FIG. 2 is a block diagram of an example of a vehicle control and operation system according to an embodiment.

FIG. 2 shows a more detailed example of a vehicle control and operation system 150. The illustrated system 150 may be readily substituted for the pose estimation and calibration system of the vehicle 110 (FIG. 1), already discussed.

In the illustrated example, the vehicle control and operation system 150 may include a first system 152, a second system 154, a third system 156 and a fourth system 158 that are different systems of the vehicle. The vehicle control and operation system 150 may include a first ECU 160 to control the first system 152, a second ECU 162 to control the second system 154, a third ECU 164 to control the third system 156 and a fourth ECU 168 to control a fourth system 158. The system 150 may include a sensor array interface 166 that interfaces with a plurality of sensors, for example a global positioning system sensor, proximity sensor, image sensor, audio sensor, impact sensor, deceleration sensor, acceleration sensor to obtain sensor data. The sensor array interface 166 may interface with any type of sensor suitable for operations as described herein.

The first, second, third and fourth ECUs 160, 162, 164, 168 may receive data from the sensor array interface 166 to determine whether to execute a triangulation and calibration process as described herein. For example, if the acceleration sensor or deceleration sensor transmit data that indicates a sudden change in speed, the first-fourth ECUs 160, 162, 164, 168 may execute the triangulation and calibration process. In detail, a sudden change in acceleration or velocity may indicate an accident occurred, and so when the first-fourth ECUs 160, 162, 164, 168 detect such a sudden change, the first-fourth ECUs 160, 162, 164, 168 respond accordingly to execute the triangulation and calibration process. Similarly, the first-fourth ECUs 160, 162, 164, 168 may access sensor data to determine whether an event occurred which may cause a change in poses (e.g., positions or orientations) of the first-fourth ECUs 160, 162, 164, 168.

The first ECU 160 may include a processor 160a (e.g., embedded controller, central processing unit/CPU) and a memory 160b (e.g., non-volatile memory/NVM and/or volatile memory) containing a set of instructions, which when executed by the processor 160a, cause the first ECU 160 to control the first system 152 and execute a triangulation and calibration process as described herein. Additionally, the second ECU 162 may include a processor 162a (e.g., embedded controller, central processing unit/CPU) and a memory 162b (e.g., non-volatile memory/NVM and/or volatile memory) containing a set of instructions, which when executed by the processor 162a, cause the second ECU 162 to control the second system 154 and execute a triangulation and calibration process as described herein. Additionally, the third ECU 164 may include a processor 164a (e.g., embedded controller, central processing unit/CPU) and a memory 164b (e.g., non-volatile memory/NVM and/or volatile memory) containing a set of instructions, which when executed by the processor 164a, cause the third ECU 164 to control the third system 156 and execute a triangulation and calibration process as described herein. Further, the fourth ECU 168 may include a processor 168a (e.g., embedded controller, central processing unit/CPU) and a memory 168b (e.g., non-volatile memory/NVM and/or volatile memory) containing a set of instructions, which when executed by the processor 168a, cause the fourth ECU 168 to control the fourth system 158 and execute a triangulation and calibration process as described herein.

The system 150 may further include a user interface 172 (e.g., audio and/or visual interface). The user interface 172 may allow a user to provide an instruction to trigger the triangulation and calibration process. Further, if a change in pose of one or more of the first ECU 160, second ECU 162, third ECU 164 and fourth ECU 168 is detected, the user interface 172 may provide a notification to the user. If the change is potentially dangerous and/or inhibit the vehicle, the user may be notified through the user interface 172. The system 150 may further communicate such potentially dangerous changes and/or vehicle inhibitions to a third party through external communicator 170 of the system 150. The external communicator 170 may be a wireless device, internet connection, etc.

Figure 3:
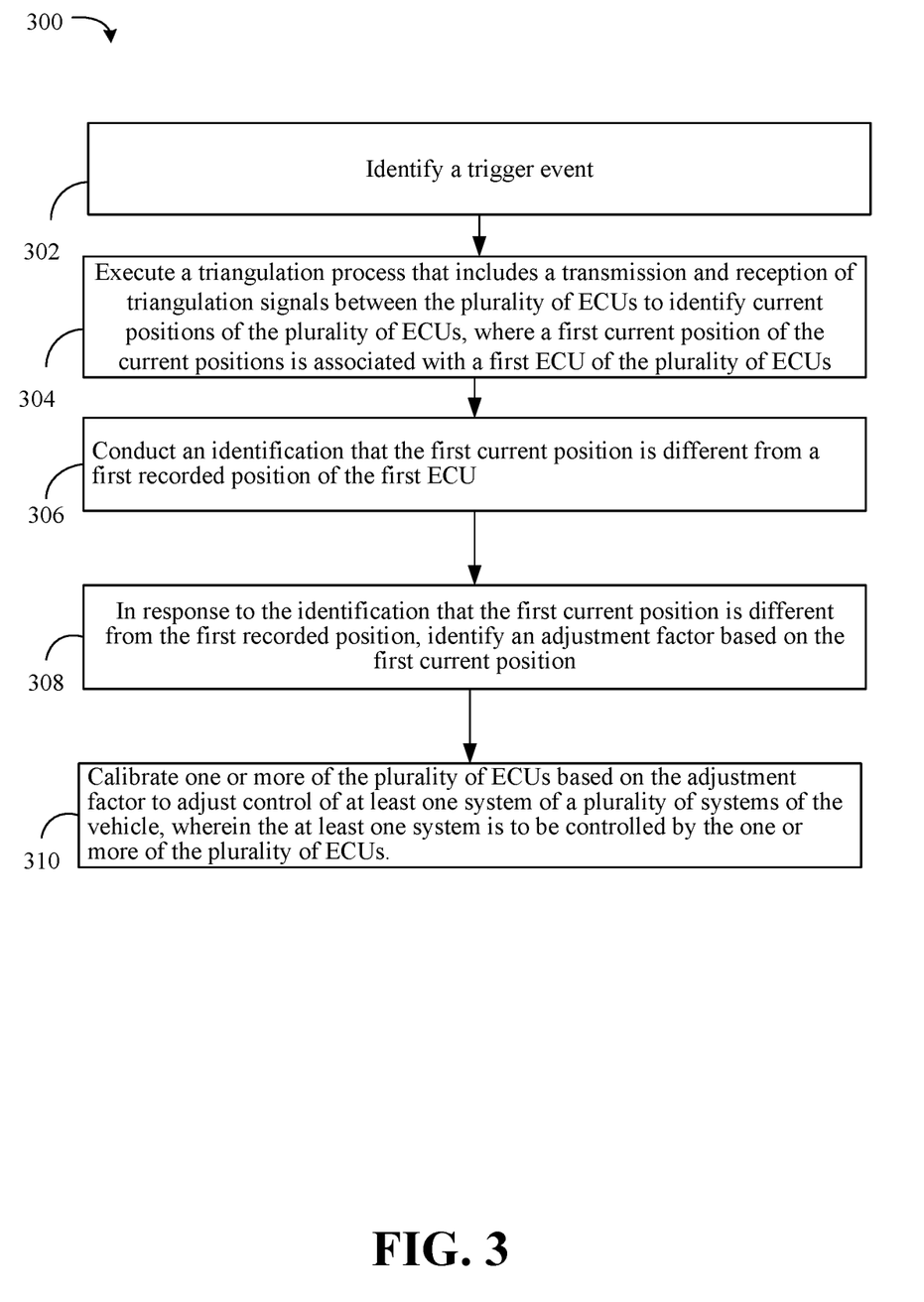
FIG. 3 is a flowchart of an example of a method of triangulation and calibration of ECUs according to an embodiment.

FIG. 3 shows a method 300 of triangulation and calibration of ECUs. The method 300 may generally be implemented in one or more ECUs, such as, for example, one or more of the first-fourth ECUs 102a-102d (FIG. 1) and/or the system 150 (FIG. 2). In an embodiment, the method 300 is implemented in logic instructions (e.g., software), configurable logic, fixed-functionality hardware logic, etc., or any combination thereof.

Illustrated processing block 302 identifies a trigger event. The trigger event may correspond to events that potentially cause a change in positions of ECUs. In some embodiments the trigger event may be satisfied when a current condition (load, temperature, etc.) of the vehicle is different from a previous condition of the vehicle at which time a recorded pose estimation was identified.

For example, the trigger event may include an identification of significant acceleration (e.g., magnitude of acceleration above a threshold for example during a turn) and/or a sudden change in velocity. For example, sudden changes in acceleration and/or velocity may dislodge or move ECUs. Likewise, the trigger event may also include an identification of force applied to the vehicle being above a threshold, for example as detected by a force sensor. The trigger event may also be an identification of impact and/or accident, for example through image recognition, impact detection sensors, biometrics of a user indicate a heighted anxiety level (e.g., elevated heart rate, facial recognition indicates excessive stress, etc.).

In some embodiments, the trigger event may include an identification of a new ECU being added into the vehicle. For example, a newly added ECU may "announce" its presence to other ECUs through transmission signals to the other ECUs. The trigger event may also include an ECU being removed (e.g., being dislodged or intentionally removed) from the vehicle or being in a non-responsive state. For example, periodically the ECUs may poll each other to determine whether the ECUs are all still in the vehicle and functioning. If one ECU of the ECUs is found to be nonresponsive (caused by either a malfunction of the one ECU or a removal of the one ECU through an accident or falling off), the trigger event may be considered satisfied. In some embodiments, the ECUs may identify that the one ECU is unresponsive during operation, for example by failing to receive required data from the one ECU.

In some embodiments, the trigger event may be identified based on differences in temperature. For example, suppose the recorded posture was identified at a first temperature of the vehicle, and presently the vehicle is at a second temperature. If a difference between the first and second temperatures is above a threshold, the trigger event may be considered satisfied.

In some embodiment, the trigger event may be an expiration of a timer. The timer may be set when the ECUs last executed triangulation and pose estimation process. When the timer expires, the ECUs may automatically execute another triangulation and pose estimation process. In some embodiments, the trigger event may be an identification that the vehicle has travelled a certain amount of distance since the last triangulation and pose estimation process.

In some embodiments, the identification of the trigger event may be based on a load on the vehicle. For example, suppose the recorded posture was identified at a first load of the vehicle, and the vehicle is currently at a second load. If a difference between the first and second loads is above a threshold, the trigger event may be considered satisfied. In some embodiments, if the first load is above a threshold, the trigger event may be satisfied. Similarly, if weight distribution of the recorded posture is different from a current weight distribution of the vehicle, the trigger may be considered satisfied.

Illustrated processing block 304 execute a triangulation process that includes a transmission and reception of triangulation signals between the plurality of ECUs to identify current positions of the plurality of ECUs, where a first current position of the current positions is associated with a first ECU of the plurality of ECUs. Illustrated processing block 306 conducts an identification that the first current position is different from a first recorded position of the first ECU. The first recorded position (and any other recorded positions described herein) may be a previously identified position, for example as identified during a previous triangulation process. In some embodiments, the first recorded position (and any other recorded positions described herein) may be recorded during various stages of the vehicle by an installer or operator, for example during manufacture, arrival at a sales lot or at a sale of the vehicle.

In response to the identification that the first current position is different from the first recorded position, illustrated processing block 308 identifies an adjustment factor based on the first current position. The updated adjustment factor may include a weight adjustment for calculations, an updated position (e.g., the first current position), error adjustments, and so forth. Illustrated processing block 310 calibrates one or more of the plurality of ECUs based on the adjustment factor to adjust control of at least one system of a plurality of systems of the vehicle, wherein the at least one system is to be controlled by the one or more of the plurality of ECUs.

Figure 4:
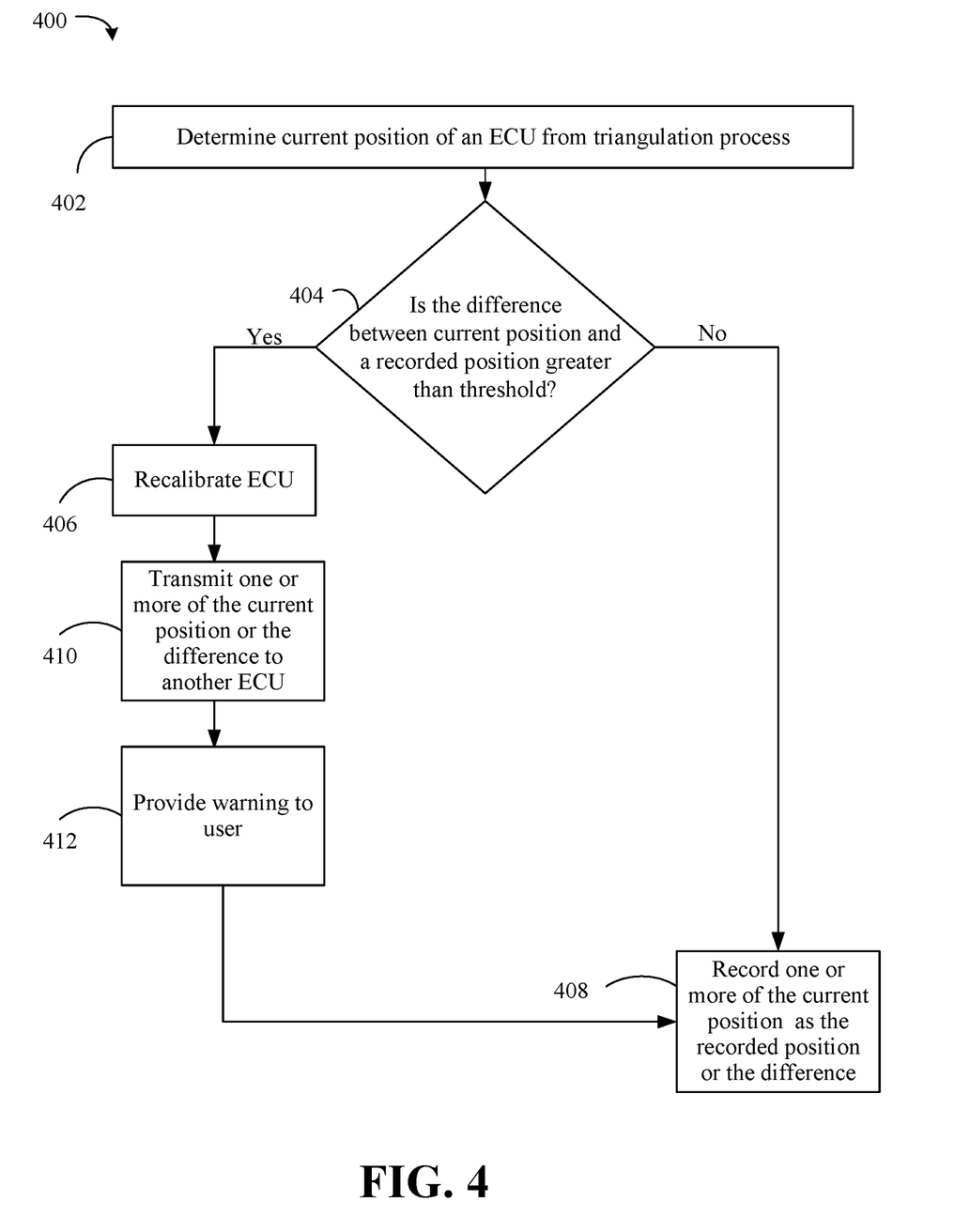
FIG. 4 is a flowchart of an example of a method of interrupting calibration according to an embodiment.

FIG. 4 shows a method 400 of calibration. The method 400 may generally be implemented in an ECU, such as, for example, one or more of the first-fourth ECUs 102a-102d (FIG. 1) and/or the system 150 (FIG. 2). In an embodiment, the method 400 is implemented in logic instructions (e.g., software), configurable logic, fixed-functionality hardware logic, etc., or any combination thereof.

Illustrated processing block 402 determines a current position of an ECU from a triangulation process. Illustrated processing block 404 determines whether the difference between the current position and a recorded position of the ECU is greater than a threshold. If so, illustrated processing block 406 recalibrates the ECU based on the current position. Illustrated processing block 410 transmits one or more of the current position or the difference to another ECU. Illustrated processing block 412 provides a warning to a user. It is worthwhile to note that the order of processing block 406, 410 and 412 are for illustrative purposes, and may be executed in other orders or concurrently with each other. Moreover, one or more of the processing block 406, 410 and 412 may be omitted. Furthermore, any of the blocks 406, 410, 412 may lead to processing block 408 (explained below). If illustrated processing block 404 determines that the difference is not greater than the threshold, illustrated processing block 408 records one or more of the current position as the recorded position or the difference. That is, the current position may be stored as a new recorded position for future calibration purposes and comparisons.

Figure 5:
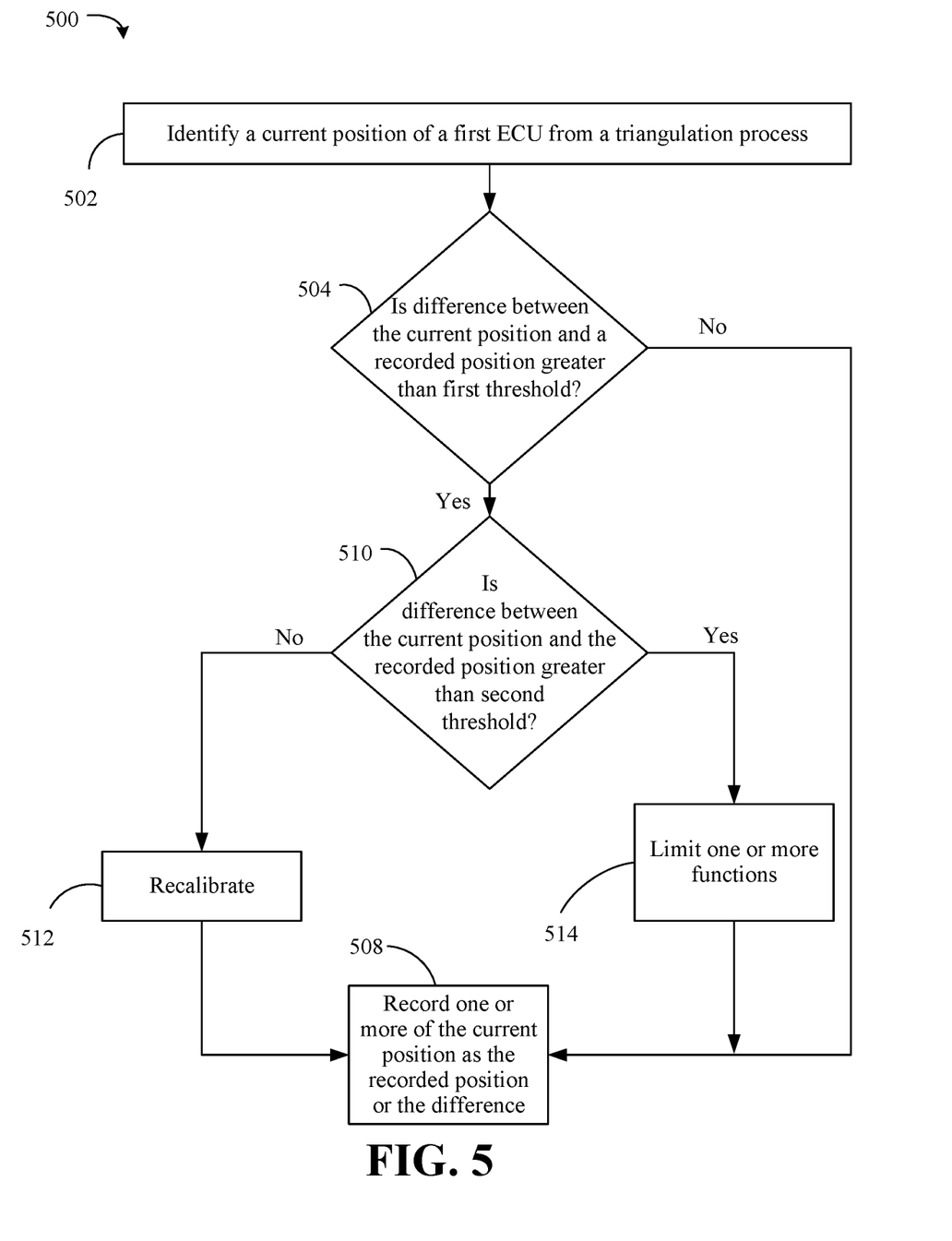
FIG. 5 is a flowchart of an example of a method of calibration and limiting functions according to an embodiment.

FIG. 5 shows a method 500 of calibration and limiting functions. The method 500 may generally be implemented in an ECU, such as, for example, one or more of the first-fourth ECUs 102a-102d (FIG. 1) and/or the system 150 (FIG. 2). In an embodiment, the method 500 is implemented in logic instructions (e.g., software), configurable logic, fixed-functionality hardware logic, etc., or any combination thereof.

Illustrated processing block 502 identifies a current position of a first ECU from a triangulation process. Illustrated processing block 504 determines whether a difference between the current position and a recorded position are greater than a first threshold. If not, illustrated processing block 506 records one or more of the current position as a new recorded position for the first ECU or the difference. Otherwise, illustrated processing block 510 determines whether a difference between the current position and a recorded position is greater than a second threshold. The second threshold may be greater than the first threshold. If so, the first ECU may limit one or more functions (e.g., power brakes, maximum speed, actuation of vehicle) of a system controlled by the first ECU. Illustrated processing block 514 may further include recalibration of other functions of the first system controlled by the first ECU. Otherwise, illustrated processing block 512 recalibrates the first ECU. In some embodiments, illustrated processing blocks 512, 514 may be executed at a second ECU to limit and/or recalibrate functions of a second system controlled by the second ECU based on the difference and/or current position of the first ECU. In some embodiments, processing block 514 may cease execution of one or more functions. Processing block 508 may then execute.

Figure 6:
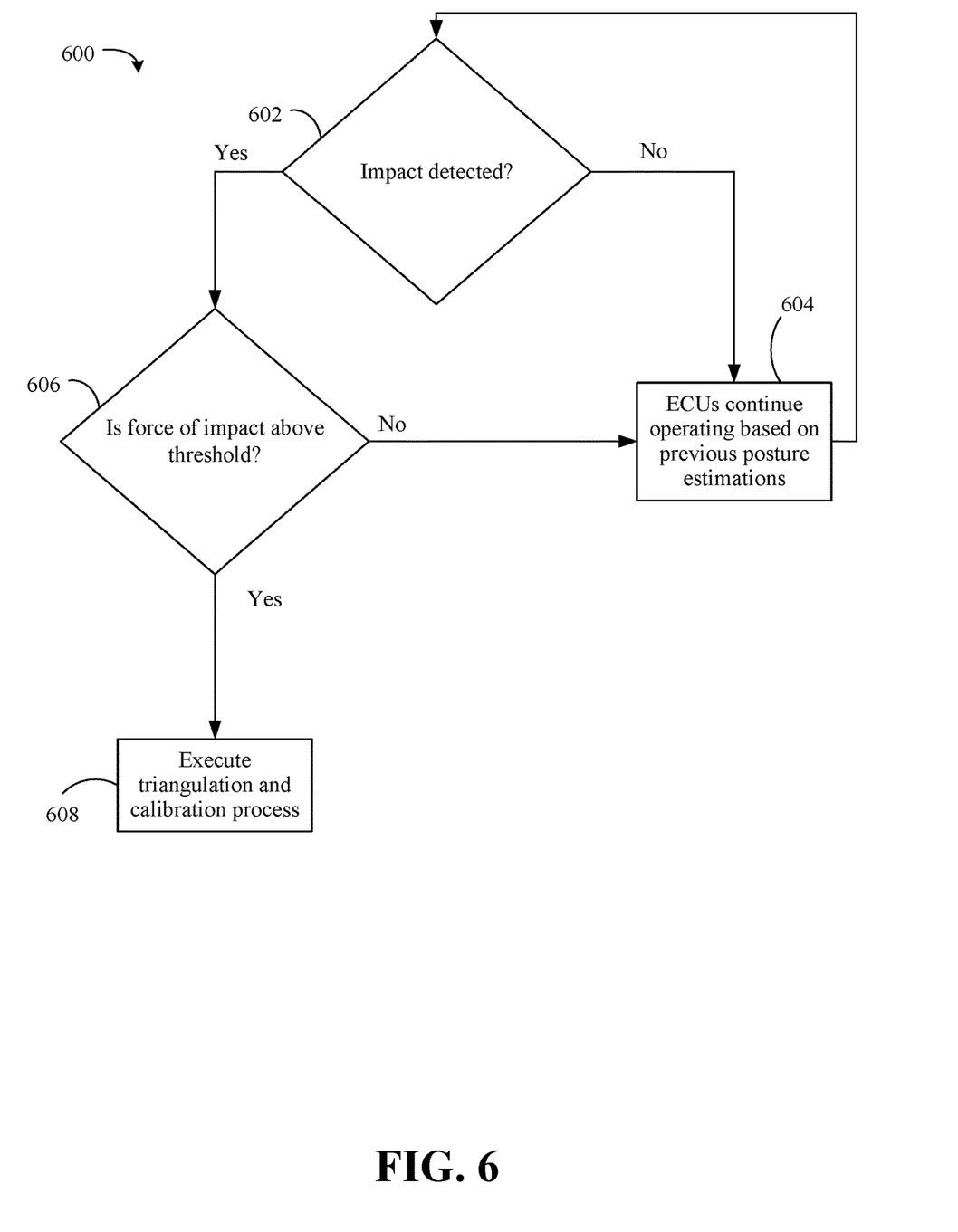
FIG. 6 is a flowchart of an example of a method of triggering a triangulation and calibration process based on impact detection according to an embodiment.

FIG. 6 shows a method 600 of triggering a triangulation and calibration process. The method 600 may generally be implemented in an ECU, such as, for example, one or more of the first-fourth ECUs 102a-102d (FIG. 1) and/or the system 150 (FIG. 2). In an embodiment, the method 600 is implemented in logic instructions (e.g., software), configurable logic, fixed-functionality hardware logic, etc., or any combination thereof.

Illustrated processing block 602 determines if an impact occurred (e.g., through sensor data). If not, illustrated processing block 604 continues operating the ECUs based on previously identified posture estimations. If an impact is detected, illustrated processing block 606 determines if the force is above a threshold. The threshold may correspond to a force that is sufficient to move the ECUs. If so, illustrated processing block 608 executes the triangulation and calibration process. Otherwise, illustrated processing block 604 executes.

Figure 7:
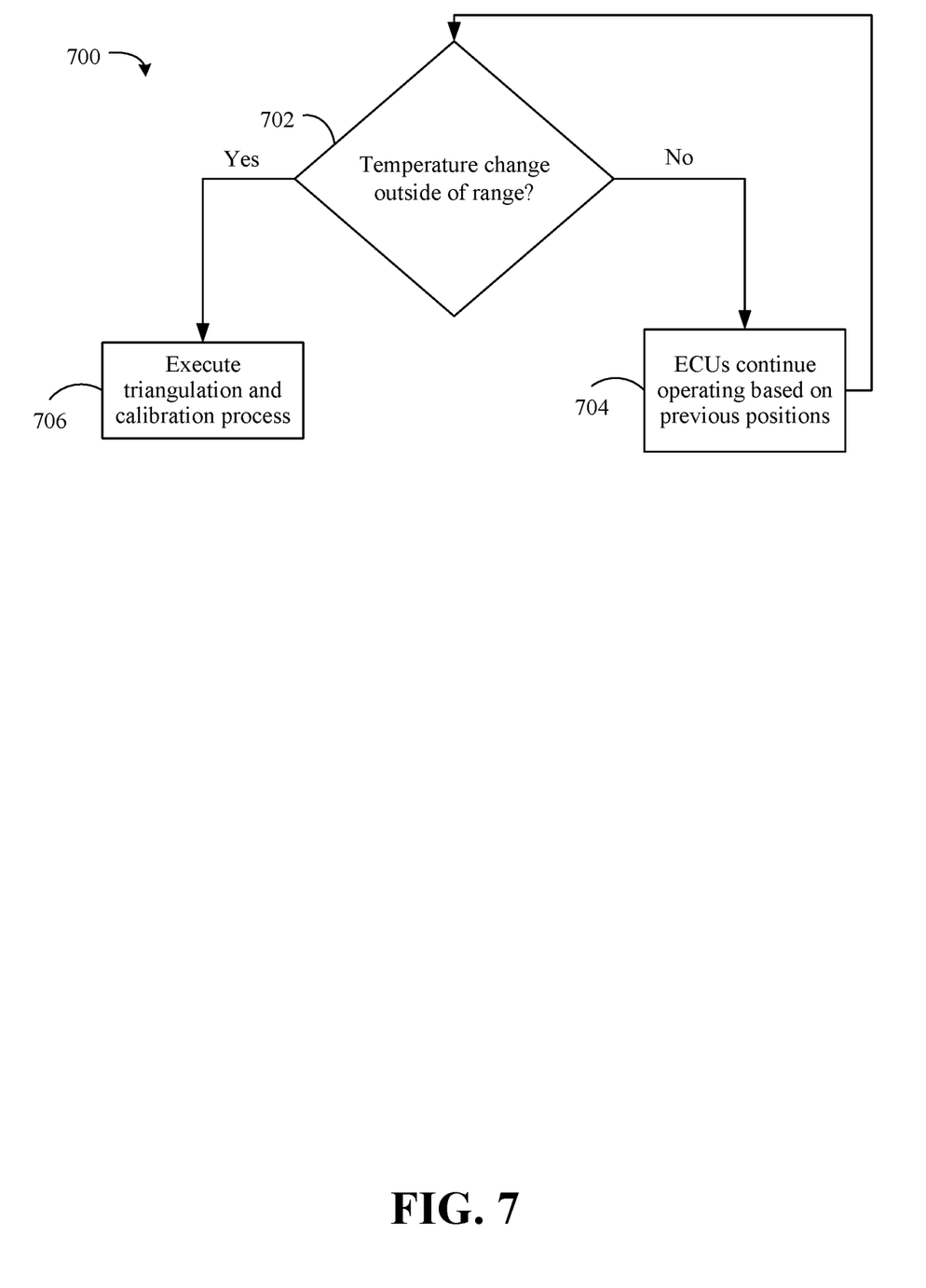
FIG. 7 is a flowchart of an example of a method of triggering a triangulation and calibration process based on temperatures according to an embodiment.

FIG. 7 shows a method 700 of triggering a triangulation and calibration process. The method 700 may generally be implemented in an ECU, such as, for example, one or more of the first-fourth ECUs 102a-102d (FIG. 1) and/or the system 150 (FIG. 2). In an embodiment, the method 700 is implemented in logic instructions (e.g., software), configurable logic, fixed-functionality hardware logic, etc., or any combination thereof.

Illustrated processing block 702 determines if a temperature change is outside of a range (e.g., through sensor data). The temperature change may correspond to difference in temperature between a last execution of the triangulation and calibration process (during which time a recorded posture is identified and stored) and a current temperature. If not, illustrated processing block 704 continues operating the ECUs based on previously identified posture estimations. If the temperature change is outside the range, illustrated processing block 706 executes the triangulation and calibration process.

Figure 8:
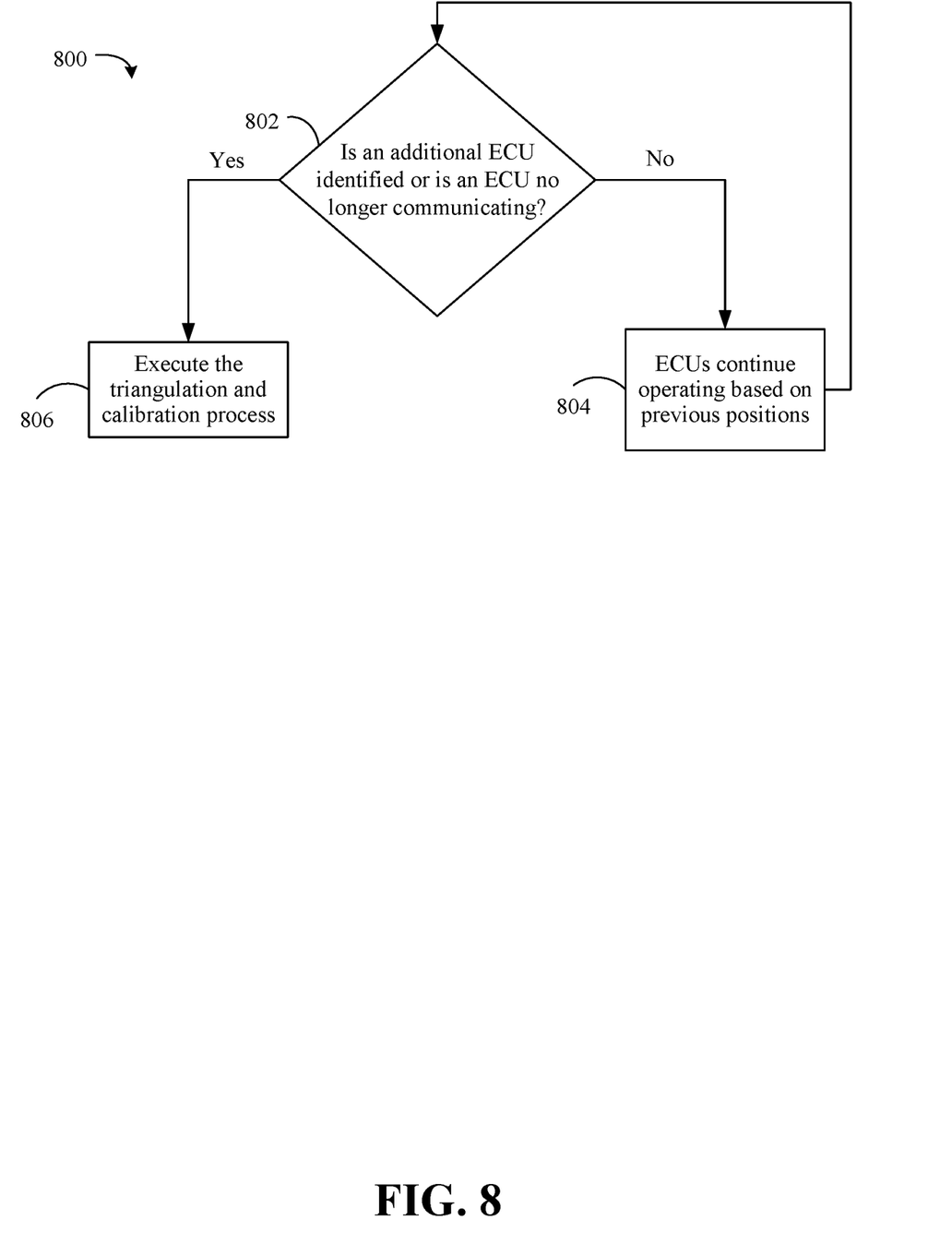
FIG. 8 is a flowchart of an example of a method of triggering a triangulation and calibration process based on changes to an ECU network according to an embodiment.

FIG. 8 shows a method 800 of triggering a triangulation and calibration process based on changes to an ECU network. The method 800 may generally be implemented in an ECU, such as, for example, one or more of the first-fourth ECUs 102a-102d (FIG. 1) and/or the system 150 (FIG. 2). In an embodiment, the method 800 is implemented in logic instructions (e.g., software), configurable logic, fixed-functionality hardware logic, etc., or any combination thereof.

Illustrated processing block 802 determines if an additional ECU is identified as being part of the ECU network or if an ECU of the ECU network is no longer communicating with other ECUs. If not, illustrated processing block 804 continues operating the ECUs based on previously identified posture estimations. If so, illustrated processing block 806 executes the triangulation and calibration process.

The above described methods and systems may be readily combined together if desired. The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system for a vehicle, the system comprising:
a plurality of systems; and
a plurality of electronic control units (ECUs) disposed at a plurality of positions in the vehicle and to control the plurality of systems, wherein the plurality of ECUs include control logic to:
identify a trigger event; and
in response to the trigger event being identified,
execute a triangulation process that includes a transmission and reception of triangulation signals between the plurality of ECUs to identify current orientations of the plurality of ECUs, wherein a first current orientation of the current orientations is associated with a first ECU among the plurality among ECUs,
conduct an identification that the first current orientation is different from a first recorded orientation of the first ECU,
in response to the identification that the first current orientation is different from the first recorded position, identify an adjustment factor based on the first current orientation, and
calibrate one or more of the plurality of ECUs based on the adjustment factor to adjust control of at least one system of the plurality of systems controlled by the one or more of the plurality of ECUs.

2. The system of claim 1, wherein the control logic is to:
transmit one or more of the first current orientation or the adjustment factor from the first ECU to a second ECU of the plurality of ECUs;
modify one or more control parameters of the second ECU based on the adjustment factor; and
control, with the second ECU, the at least one system based on the modified one or more control parameters.

3. The system of claim 1, wherein the trigger event is associated with an increased likelihood of one or more of the plurality of ECUs being reorientated.

4. The system of claim 1, wherein the trigger event is a detection of impact on the vehicle.

5. The system of claim 1, wherein the trigger event is an insertion of one or more of the plurality of ECUs into the vehicle.

6. The system of claim 1, wherein the trigger event is a temperature change.

7. The system of claim 1, wherein the trigger event is an unavailability of one of the plurality of ECUs.

8. The system of claim 1, wherein the current orientations of the plurality of ECUs relate to one or more of yaw, pitch or roll of the plurality of ECUs.

9. At least one computer readable storage medium comprising a set of instructions, which when executed by one or more of a plurality of electronic control units (ECUs) of a vehicle, cause the one or more of the plurality of ECUs to:
identify a trigger event; and
in response to the trigger event being identified,
execute a triangulation process that includes a transmission and reception of triangulation signals between the plurality of ECUs to identify current orientations of the plurality of ECUs, wherein a first current orientation among the current orientations is associated with a first ECU among the plurality of ECUs,
conduct an identification that the first current orientation is different from a first recorded orientation of the first ECU,
in response to the identification that the first current orientation is different from the first recorded orientation, identify an adjustment factor based on the first current orientation, and
calibrate one or more of the plurality of ECUs based on the adjustment factor to adjust control of at least one system of a plurality of systems of the vehicle, wherein the at least one system is to be controlled by the one or more of the plurality of ECUs.

10. The at least one computer readable storage medium of claim 9, wherein the instructions, when executed, cause the one or more of the plurality of ECUs to:
cause one or more of the first current orientation or the adjustment factor to be transmitted from the first ECU to a second ECU of the plurality of ECUs;
modify one or more control parameters of the second ECU based on the adjustment factor; and
cause the second ECU to control the at least one system based on the modified one or more control parameters.

11. The at least one computer readable storage medium of claim 9, wherein the trigger event is associated with an increased likelihood of one or more of the plurality of ECUs being reorientated.

12. The at least one computer readable storage medium of claim 9, wherein the trigger event is a detection of an impact on the vehicle.

13. The at least one computer readable storage medium of claim 9, wherein the trigger event is an insertion of one or more of the plurality of ECUs into the vehicle.

14. The at least one computer readable storage medium of claim 9, wherein the trigger event is a temperature change.

15. The at least one computer readable storage medium of claim 9, wherein the trigger event is an unavailability of one of the plurality of ECUs.

16. The at least one computer readable storage medium of claim 9, wherein the current orientations of the plurality of ECUs relate to one or more of yaw, pitch or roll of the plurality of ECUs.

17. A method of controlling a plurality of electronic control units (ECUs) of a vehicle, the method comprising:
identifying a trigger event; and
in response to the trigger event being identified,
executing a triangulation process that includes a transmission and reception of triangulation signals between the plurality of ECUs to identify current orientations of the plurality of ECUs, wherein a first current orientation among the current orientations is associated with a first ECU among the plurality of ECUs,
conducting an identification that the first current orientation is different from a first recorded orientation of the first ECU,
in response to the identification that the first current orientation is different from the first recorded orientation, identifying an adjustment factor based on the first current orientation, and
calibrating one or more of the plurality of ECUs based on the adjustment factor to adjust control of at least one system of a plurality of systems of the vehicle, wherein the at least one system is to be controlled by the one or more of the plurality of ECUs.

18. The method of claim 17, further comprising:
transmitting one or more of the first current orientation or the adjustment factor from the first ECU to a second ECU of the plurality of ECUs;
modifying one or more control parameters of the second ECU based on the adjustment factor; and
controlling, with the second ECU, the at least one system based on the modified one or more control parameters.

19. The method of claim 17, wherein the trigger event is associated with an increased likelihood of one or more of the plurality of ECUs being reorientated.

20. The method of claim 17, wherein the current orientations of the plurality of ECUs relate to one or more of yaw, pitch or roll of the plurality of ECUs.

* * * * *